Patented June 12, 1945

2,378,281

UNITED STATES PATENT OFFICE 2,378,281

METHOD OF DEHYDRATING ORGANIC SOLVENTS, PETROLS, OILS, AND THE LIKE

Rowland Jay Browne, Hoddesdon, England, assignor to African Sisal & Produce Company Limited, London, England, a British company No Drawing. Application August 24, 1942, Serial No. 455,948. In Great Britain August 27, 1941

14 Claims. (Cl. 210—42.5)

This invention relates to a new or improved method of and means for dehydrating organic solvents, petrols, oils and kindred liquids, such as are not per se ordinarily miscible with water.

When the flesh of vegetable matter, and particularly plants of the agave type, including Agave sisalana, is treated with water, a water soluble extract is obtained, that may be dehydrated, dried and reduced to granular dimensions. Again, if the pulp of vegetable flesh remaining from the water extraction, or the total flesh and juice of such vegetable matter, be extracted with an alkali such as sodium carbonate or better still with tri-sodium phosphate, and the extract obtained be evaporated or otherwise reduced to dryness, a material results which consists in the main of salts of polygalacturonic acids, that have very strong water absorbency with increase of bulk, and which upon removal from the solvent have the reverse attribute of speedily drying to an amorphous condition for reuse, with apparently unimpaired qualities. Alternatively the said extract may be precipitated with an acid to give the corresponding galacturonic acids and then filter pressed and dried, and this material has similarly very marked dehydrating qualities, accompanied by increase of bulk.

According to the present invention advantage is taken of this reversible quality of the reagent and the invention consists in inserting any necessary quantity of the dry product into a water pervious or porous container such as a canvas or linen bag, or a porous pot or suitable semipermeable membrane leaving ample room for expansion of the contents, and of immersing same in the base of the tank or other container of the liquid to be dehydrated.

Alternatively, the material, in a finely divided condition, such as may be obtained by spray drying, may be blown or otherwise dispersed through the liquid to be dehydrated or it may be contained in a trough or sump at the bottom of the containing vessel, from which it may be drawn periodically as a sludge and then desiccated for reuse.

The said polygalacturonic salt or acid material in its dry condition will absorb many times its own weight of water and its limit of absorbency may be reached within ten to fifteen minutes of immersion, but this time period varies directly with the surface of dehydrant exposed. Thus if time be of consequence many separate bags or containers may be used in lieu of one. If now the container and its contents, or the sludge, be removed and be left to dry in a suitable atmosphere or otherwise dried in an ordinary manner, the dehydrant will lose its surplus water content and revert to its original apparent dry and nodular condition, and be ready for reuse.

Whilst the material obtained from the vegetable flesh has been described in its preferred form as salts of polygalacturonic acids, some of their salts in their degree of being reversibly water soluble or by virtue of their different powers of absorption of water are preferable to others. Thus the water soluble salts derived from polygalacturonides such as the potassium, sodium or ammonium salts are more efficacious than the precipitated acids.

A practical application of the present invention is to provide means as set out above for dehydrating fuel such as petrol and kerosene whilst in tanks or other receptacles used as reservoirs for fuel for internal combustion engines. Water either in the fuel or tank may be adventitious, i. e. the result of moisture condensation upon the sides of the tanks or conduits connected thereto, and which if not removed gravitates to the base of the tank and will accumulate. Such accumulation constitutes a very potential danger of engine trouble, and its removal is imperative for a continuous and constant performance. Dehydration of ethers, turpentine, carbon tetrachloride, trichlorethylene, tetrachlorethylene, chloroform, oils, petrols and kerosenes including paraffin oils and other like solvents has been successfully accomplished.

To this end and assuming the type of polygalacturonic acid or salt employed to be capable of absorbing say five times its own weight of water, 10 lbs. of acid or salt will absorb in a relatively short space of time 5 gallons of water. The water permeated polygalacturonic acid or salt in this condition is heavier than most solvents and remains in the permeable container, or if introduced by admixture to the liquid to be hydrated gravitates to the base of the tank. The acid or salt container may now be removed, or if admixed broadcast can be separated as a sludge, either or both upon removal being subjected to desiccation and recomminution for reuse.

It will be understood that the polygalacturonides present in the plant flesh may be extracted by any known means whatever, and subsequently hydrolysed with alkali to the corresponding salt. This salt may be isolated or precipitated with acid, and the polygalacturonic acid so obtained be neutralised with any alkaline or basic material to produce the required salt.

I claim:

1. Process for the dehydration of organic solvents, gasoline, oil and kindred liquids such as are not miscible with water and do not react with polygalacturonic acids or salts, which comprises placing in contact with the liquid to be dehydrated polygalacturonic salt in its relatively dry condition and in a quantity sufficient to absorb water in said liquid, maintaining said salt in contact with said liquid for a time period sufficient to allow the said salt to absorb water from said liquid, removing said salt from the liquid dehydrated, and desiccating said salt for reuse.

2. Process for the dehydration of organic solvents, gasoline, oil and kindred liquids such as are not miscible with water, which comprises placing in contact with the liquid to be dehydrated polygalacturonic acid in its relatively dry condition and in a quantity sufficient to absorb water in said liquid, maintaining said acid in contact with said liquid for a time period sufficient to allow said acid to absorb water from said liquid, removing said acid from the liquid dehydrated, and desiccating said acid for reuse.

3. Process for the dehydration of organic solvents, gasoline, oil and kindred liquids such as are not miscible with water and do not react with polygalacturonic acids or salts, which comprises placing in contact with the liquid to be dehydrated polygalacturonic salt in its relatively dry condition in a water permeable container and in a quantity sufficient to absorb water in said liquid, and removing said salt from said liquid.

4. Process for the dehydration of organic solvents, gasoline, oil and kindred liquids such as are not miscible with water, and do not react with polygalacturonic acids or salts, which comprises placing in contact with the liquid to be dehydrated polygalacturonic acid in its relatively dry condition in a water permeable container and in a quantity sufficient to absorb water in said liquid, and removing said acid from said liquid.

5. Process for the dehydration of organic solvents, gasoline, oil and kindred liquids such as are not miscible with water and do not react with polygalacturonic acids or salts, which comprises placing in contact with the liquid to be dehydrated polygalacturonic salt in its relatively dry condition in a water permeable container and in substantially the proportion by weight of one part of said salt to five parts of water in said liquid, maintaining said salt in contact with said liquid for a time interval sufficient to permit water absorption by the said galacturonic salt, removing said container with its contents from said liquid, and dewatering said salt and container for reuse.

6. Process for the dehydration of organic solvents, gasoline, oil and kindred liquids such as are not miscible with water and do not react with polygalacturonic acids or salts, which comprises placing in contact with the liquid to be dehydrated polygalacturonic acid in its relatively dry condition in a water permeable container and in substantially the proportion by weight of one part of said acid to five parts of water in said liquid, maintaining said acid in contact with said liquid for a time interval sufficient to permit water absorption by the said galacturonic acid, removing said container with its contents, and dewatering said acid and container for reuse.

7. Process for the dehydration of organic solvents, gasoline, oil and kindred liquids such as are not miscible with water and do not react with polygalacturonic acids or salts, which comprises placing polygalacturonic salt in contact with said liquid by admixing said salt in its relatively dry condition with said liquid as a broadcast medium and in a quantity sufficient to absorb water in said liquid, maintaining said salt in contact with said liquid for a time interval sufficient for reaction and absorption, collecting the salt in its water charged condition as a sludge, and dehydrating said salt to substantially its original consistency for reuse.

8. Process for the dehydration of organic solvents, gasoline, oil and kindred liquids such as are not miscible with water and do not react with polygalacturonic acids or salts, which comprises placing polygalacturonic acid in contact with the liquid to be dehydrated by admixing said acid in its relatively dry condition with said liquid as a broadcast medium and in a quantity sufficient to absorb water in said liquid, maintaining said acid in contact with said liquid for a time interval sufficient for reaction and absorption, collecting the acid in its water charged condition as a sludge, and dehydrating said acid to substantially its original consistency for reuse.

9. Process for the dehydration of organic solvents, gasoline, oil and kindred liquids such as are not miscible with water and do not react with polygalacturonic acids or salts, which comprises placing polygalacturonic salt in its relatively dry condition in contact with the liquid to be dehydrated by introducing said salt, in a quantity sufficient to absorb water in said liquid, to the base of the liquid container, and periodically withdrawing said salt for desiccation and reuse.

10. Process for the dehydration of organic solvents, gasoline, oil and kindred liquids such as are not miscible with water and do not react with polygalacturonic acids or salts, which comprises placing polygalacturonic acid in its relatively dry condition in contact with the liquid to be dehydrated by introducing said acid, in a quantity sufficient to absorb water in said liquid, to the base of the liquid container, and periodically withdrawing said acid from said liquid for desiccation and reuse.

11. A process for the dehydration of solvents of other than animal orgin by contacting therewith polygalacturonic salts in a quantity sufficient to absorb water therefrom, and removing said salts from the dehydrated solvent, characterized that the said salts are obtained from flesh of plants of the agave species including *Agave sisalana*.

12. A process for the dehydration of solvents of other than animal orgin by contacting therewith polygalacturonic acids in a quantity sufficient to absorb water therein, and removing said acids from the dehydrated solvent, characterized that the said acids are obtained from flesh of plants of the agave species including *Agave sisalana*.

13. In a process for the dehydration of organic solvents, gasoline, oil and kindred liquids such as are not miscible with water and do not react with polygalacturonic acids or salts, wherein polygalacturonic material selected from a group consisting of sodium, potassium and ammonium polygalacturonic salts and acids in its relatively dry condition is placed in contact with the liquid to be dehydrated in a quantity sufficient to absorb water in said liquid by placing said material in said liquid in a permeable container for concentrated bulk introduction therein, and removing said container and its contents from the dehydrated liquid.

14. A process for the dehydration of organic solvents, gasoline, oil and kindred liquids such as are not miscible with water and do not react with polygalacturonic acids or salts, which comprises placing in contact with the liquid to be dehydrated polygalacturonic material selected from a group consisting of sodium, potassium and ammonium polygalacturonic salts and acids in its relatively dry condition and in substantially the proportion by weight of one part of said polygalacturonic material to five parts of water in said liquid, and removing the polygalacturonic material from the dehydrated liquid.

ROWLAND JAY BROWNE.